United States Patent Office 3,102,885
Patented Sept. 3, 1963

3,102,885
TRIAZINYLALKYL PHOSPHATES
Gerald Berkelhammer, Ewing Township, Mercer County, Frank A. Wagner, Jr., Belle Mead, and Richard J. Magee, Princeton, N.J., assignors to American Cyanamid Company, Stamford, Conn., a corporation of Maine
No Drawing. Filed July 19, 1962, Ser. No. 211,101
7 Claims. (Cl. 260—248)

The present invention relates to a new class of triazinyl compounds. More particularly, the invention relates to new triazinylalkyl phosphates and to the novel preparation thereof.

This application constitutes a continuation-in-part of our copending application for U.S. Letters Patent, Serial No. 32,603, filed on May 31, 1960, now abandoned.

The novel triazinylalkyl phosphates of this invention are represented by the general formula:

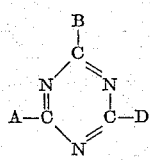

in which A is the radical:

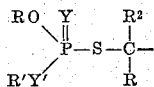

wherein:
R and R' are lower alkyl,
Y and Y' are each oxygen or sulfur,
R² and R³ are either hydrogen or lower alkyl,
B represents hydrogen, lower alkyl, or lower alkoxy,
D is hydrogen, a lower alkyl radical, a lower alkoxy radical, or the radical represented by A.

Illustrative compounds prepared by the process of the invention are:

O,O-dimethyl S-(4,6-dimethyl-s-triazin-2-yl) methyl ester of phosphorodithioic acid
O,O-diethyl S-(4,6-dimethyl-s-triazin-2-yl)methyl ester of phosphorodithioic acid
O,O-dimethyl S-1-(4,6-diethyl-s-triazin-2-yl)ethyl ester of phosphorodithioic acid
O,O-dimethyl S-(4,6-dimethoxy-s-triazin-2-yl)methyl ester of phosphorodithioic acid
O,O-dimethyl S-(4,6-diethoxy-s-triazin-2-yl)methyl ester of phosphorodithioic acid
O,O-dimethyl S-1-(4,6-dimethyl-s-triazin-2-yl)ethyl ester of phosphorodithioic acid
O,O,O',O'-tetramethyl S,S'-(6-methyl-s-triazin-2,4-diyldimethylene) ester of phosphorodithioic acid
O,O-dimethyl S-(s-triazin-2-yl)methyl ester of phosphorodithioic acid and homologs and isomers thereof.

The compounds of the present invention are prepared in a straightforward manner. This is accomplished by reacting an ammonium or alkali metal salt of a lower dialkylthiophosphoric acid or lower dialkyldithiophosphoric acid with a haloalkyl substituted triazine in at least equimolar proportions according to the general reaction:

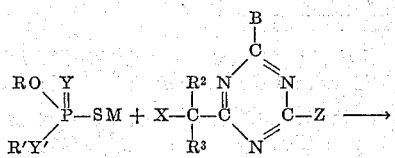

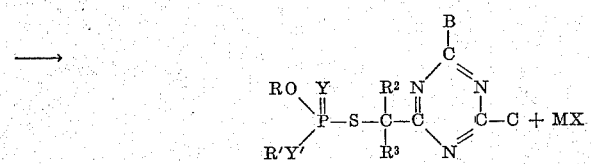

wherein: R, R', R², R³, B, D, Y and Y' are radicals as above defined, Z is either hydrogen, lower alkyl or the radical:

X representing a halogen radical such as chloro, bromo or iodo, and M is an alkali metal, such as sodium, potassium, lithium or the ammonium radical. However, when Z defined as above is the radical:

it is found that at least two mols of the salt per mol of the s-triazine are required for reaction.

In general, the acid salts include, for example:

Sodium O,O-dimethyl thiophosphate,
Potassium O,O-dimethyl dithiophosphate,
Lithium O,O-dipropyl thiophosphate,
Ammonium O,O-dipropyl dithiophosphate,
Lithium O,O-diisopropyl thiophosphate,
Sodium O,O-diisopropyl dithiophosphate,
Potassium O-methyl O-ethyl thiophosphate,
Sodium O-methyl O-ethyl dithiophosphate,
Ammonium O-methyl O-propyl thiophosphate,
Potassium O-methyl O-isopropyl dithiophosphate,
Sodium O-methyl S-ethyl dithiophosphate,
Potassium O-methyl S-methyl dithiophosphate.

Haloalkyl-substituted s-triazine reactants which conform to the general formula:

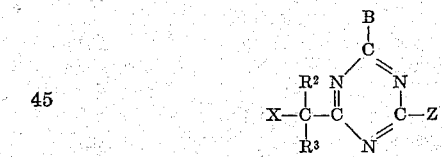

wherein X, B, Z, R², and R³ are the same as above defined, are illustrated by the following compounds:

2-bromomethyl-4,6-dimethyl-s-triazine,
2-chloromethyl-4,6-dimethyl-s-triazine,
2-chloromethyl-4,6-dimethoxy-s-triazine,
2-chloromethyl-4,6-diethoxy-s-triazine,
2(1-bromoethyl)-4,6-dipropoxy-s-triazine,
2(1-bromoethyl)-4,6-di-n-butoxy-s-triazine,
2-(1-bromoethyl)4,6-diethyl-s-triazine,
2-(1-chloroethyl)-4,6-dimethyl-s-triazine,
2-chloromethyl-s-triazine,
2,4-bis(1-chloroethyl)6-methyl-s-triazine,
2-(1-chloroethyl)-s-triazine, and equivalents thereof.

The haloalkyl-substituted s-triazine may be prepared by several methods. One method involves the reaction between s-triazine and a chloroalkyl amidine acid addition salt as disclosed in United States Letters Patent No. 2,845,422. Another method of preparation involves the reaction of a haloamidine having the guanyl grouping:

and an imidate, more fully described in a copending application for Letters Patent of F. C. Schaefer, Serial No. 12,930, filed on March 7, 1960. More specifically, one mole of either 1-chloroacetamidine hydrochloride or 1-chloropropionamidine hydrochloride and three mols of ethyl acetimidate are reacted to obtain both monochloroalkyl-s-triazine and a bis(chloroalkyl)-s-triazine and then effecting a separation to recover each s-triazine compound. A third method involves the reaction between 2-diazomethyl 4,6-dichloro-s-triazine and sodium alkoxide, such as sodium methoxide, and further reacting the so-formed product with hydrochloric acid to recover 2-chloromethyl-4,6-dialkoxy-s-triazine.

In the preparation of the triazinylalkyl phosphates of the present invention, the amounts of reactants employed will depend upon the product desired. Thus, as mentioned above, usually equimolar quantities are sufficient. However, at least two mols of the acid salt per mol of the s-triazine are necessary when the s-triazine employed is a bis-haloalkyl-substituted s-triazine.

The reaction is generally carried out in the presence of an inert organic solvent. Such solvents include, for instance, acetone, methyl isobutyl ketone, alcohol, ether, benzene, chlorinated hydrocarbons and the like. It may be advantageously carried out in the presence of a hydrogen halide acceptor, such as alkali metal carbonates or bicarbonates or alkaline earth carbonate.

In general, a wide range of temperatures extending from freezing point to the decomposition temperature of the reaction mixture may be utilized. However, it is found that the reaction may be better carried out at a temperature in a range of 10° C. to 150° C. and preferably from 20° C. to about 100° C.

The new class of compounds of this invention are useful as insecticides, by contact, stomach and systemic action and as acaricides. Such compounds can be used for insecticidal purposes utilizing methods conventionally employed. For example, they may be employed as spray suspensions or dispersions, as dusts by absorption on an inert, finely divided carrier, or as aerosols. Liquid concentrates for dilution with water can also be prepared employing both a compatible organic solvent, such as acetone or xylene, and an emulsifying agent such as a higher aliphatic alcohol, an alkyl aryl sulfonate, or a higher alkyl sulfonate. Solid carrier materials which can advantageously be used, include talc, kaolinite, various clays and similar inert solid diluents. In addition, the new compounds of this invention can be employed as aerosols by dispersing the same into the atmosphere by means of a compressed halogenated hydrocarbon gas such as dichloro-difluoromethane and equivalents thereof.

The optimum concentration of these compounds to be used with any of the above carriers or methods of application will depend on many factors including the carrier employed, the pest to be controlled, type of surface to be treated, conditions of the application and the particular compound used. In general, however, the compounds of this invention are effective at concentrations of .01% to 1%, based on the total weight of the composition, although as little as 0.0001% or as much as 5%, or even more of the compounds, can be used with good results.

The following detailed examples are presented as illustrative of the preferred embodiments of the practice of the invention. It is understood that they are not to be taken as limitative thereof.

EXAMPLE 1

*O,O-Dimethyl S-(4,6-Dimethyl-s-Triazin-2-Yl)Methyl Ester of Phosphorodithioic Acid*

In a suitable reaction vessel are dissolved 9.8 parts of potassium O,O-dimethyl phosphorodithioate (0.05 mol) and 10.1 parts of 2-bromomethyl-4,6-dimethyl-s-triazine (0.05 mol) in 140 parts (by volume) of anhydrous acetone. The reaction mixture is then refluxed for one hour. After washing and removal of the solvent utilizing reduced pressure, an oily product is obtained which solidifies upon cooling. When recrystallized from diethyl ether-petroleum ether solvent mixture, a 77% yield of pure product is obtained with melting point 28.5° C.–30.0° C. having the following analysis:

Calculated: P, 11.09; N, 15.05. Found: P, 11.18; N, 14.79.

EXAMPLE 2

*O,O-Diethyl S-(4,6-Dimethyl-s-Triazine-2-Yl)Methyl Ester of Phosphorodithioic Acid*

The procedure of Example 1 is repeated, except that 11.2 parts of potassium O,O-diethyl phosphorodithioate (0.05 mol) and 10.1 parts of 2-bromomethyl-4,6-dimethyl-s-triazine (0.05 mol) are dissolved in 140 parts (by volume) of anhydrous acetone. A quantitative yield of pale yellow oil is obtained, and after several recrystallizations from petroleum ether, a solid product melting at 18.0° C.–19.0° C. is obtained analyzing as:

Calculated: P, 10.08; N, 13.67. Found: P, 10.42; N, 13.35

EXAMPLE 3

*O,O-Dimethyl S-(4,6-Diethyl-s-Triazin-2-Yl)Ethyl Ester of Phosphorodithioic Acid*

As in the procedure of Example 1, 2.5 parts of potassium O,O-dimethyl phosphorodithioate (0.012 mol) and 3.1 parts of 2-(1-bromoethyl)-4,6-diethyl-s-triazine (0.012 mol) are admixed in 65 parts (by volume) of anhydrous acetone. After refluxing for two hours, a 29% yield of product is obtained as a colorless oil analyzing as:

Calculated: P, 9.64; S, 19.95. Found: P, 9.04; S, 20.47.

EXAMPLE 4

*O,O-Dimethyl S-1-(4,6-Dimethyl-s-Triazin-2-Yl)Ethyl Ester of Phosphorodithioic Acid*

3.9 parts of potassium O,O-dimethyl phosphorodithioate (0.02 mol) and 3.4 parts of 4,6-dimethyl-2-(1-chloroethyl)-s-triazine (0.02 mol) are dissolved in a total of 65 parts of methyl isobutyl ketone. The mixture is heated to 80° C. for seven and one-half hours, cooled to room temperature and the solids filtered off. The filtrate is washed, dried and evaporated to yield 61% of theory of an oil which crystallizes below room temperature.

EXAMPLE 5

*O,O-Dimethyl S-(s-Triazin-2-Yl)Methyl Ester of Phosphorodithioic Acid*

9.8 parts of potassium O,O-dimethyl phosphorodithioate (0.05 mol) and 6.5 parts of 2-chloromethyl-s-triazine (0.05 mol) in 140 parts (by volume) of anhydrous acetone are dissolved in a suitable vessel. The mixture is then heated at 50° C. for fifty minutes. The product is obtained in 50% yield as a colorless oil having a refractive index $(n_D^{25}) = 1.5715$.

EXAMPLE 6

*O,O-Dimethyl S-(4,6-Dimethyl-s-Triazin-2-Yl) Methyl Ester of Phosphorothioic Acid*

The procedure of Example 1 is followed, using 9.0 parts of potassium O,O-dimethyl phosphorothioate (0.05 mol) and 10.1 parts of 2-bromomethyl-4,6-dimethyl-s-triazine (0.05 mol) in 140 parts (by volume) of anhydrous acetone. The mixture is refluxed for one hour. It is then cooled to room temperature and the solids are filtered off. The filtrate, after washing and evaporation, is recovered giving a colorless oil in 30% yield.

EXAMPLE 7

*O,O,O',O'-Tetramethyl S,S'-(6-Methyl-s-Triazin-2,4-Diyldimethylene) Ester of Phosphorodithioic Acid*

3.77 parts of potassium O,O-dimethyl phosphorodithioate (0.0192 mol) and 2.71 parts of 2,4-bis-(bromo-methyl)-6-methyl-s-triazine (0.0096 mol) are dissolved in a total of 25 parts of anhydrous acetone. The mixture is heated at 50° C. for fifteen minutes. It is then cooled to room temperature and the solids are filtered off. The filtrate is washed, dried and evaporated to yield 33% of theory of a colorless oil having a refractive index $(n_D^{25})=1.5838$.

EXAMPLE 8

*O,S - Dimethyl S - (4,6 - Dimethyl-s-Triazin-2-Yl)Methyl Ester of Phosphorodithioic Acid*

The procedure of Example 1 is repeated, using 9.8 parts of potassium O,S-dimethyl phosphorodithioate (0.05 mol) and 10.1 parts of 2-bromomethyl-4,6-dimethyl-s-triazine (0.05 mol) in 140 parts of anhydrous acetone. The mixture is heated to reflux for one and one-half hours and the desired product recovered as a light tan oil. Subsequent chromatographic purification gives a 25% yield of product as a light tan oil.

EXAMPLE 9

*O,O-Dimethyl S-1-(s-Triazin-2-Yl)Ethyl Ester of Phosphorodithioic Acid*

In a suitable vessel are dissolved 9.8 parts of potassium O,O-dimethyl phosphorodithioate (0.05 mol) and 7.8 parts of 2-(1-chloroethyl)-s-triazine (0.05 mol) in 140 parts (by volume) of anhydrous acetone. The mixture is refluxed for eight and one-half hours. Chromatographic purification of resultant crude product yields the pure material as an oil having a refractive index $(n_D^{25})=1.5557$.

EXAMPLE 10

*O,O-Dimethyl S-(4,6-Dimethoxy-s-Triazin-2-Yl)Methyl Ester of Phosphorodithioic Acid*

The procedure of Example 1 is followed in every detail, except that 2.75 parts of the potassium O,O-dimethyl phosphorodithioate (0.014 mol) and 2.66 parts of 2-chloromethyl-4,6-dimethoxy-s-triazine (0.014 mol) in a total of 100 parts (by volume) of acetone are employed. After stirring at room temperature overnight, 98% of theory of potassium chloride are filtered off. Chromatographic purification of the crude product yields 50% of theory of the analytically pure product as a colorless oil with a refractive index $(n_D^{25})$ equal to 1.5486.

EXAMPLE 11

*O,O - Dimethyl S - (4,6-Diethoxy-s-Triazin-2-Yl)Methyl Ester of Phosphorodithioic Acid*

By repeating Example 10 in every material detail, except that 2-chloromethyl-4,6-diethoxy-s-triazin is substituted for the dimethoxy-s-triazine reactant therein, O,O-dimethyl S-(4,6-diethoxy-s-triazin-2-yl) methyl phosphorodithioate is obtained in good yield.

Compounds prepared in accordance with the practice of the invention find utility as insecticides. To demonstrate their potency, 0.01%, 0.001% and 0.0001% solutions of active compound in 65% acetone and 35% water are prepared and sprayed on nasturtium plants infested with aphids (*Aphis rumicis*). The results are tabulated below.

TABLE 1

| Example | Product | Percent Kill Aphids | | |
|---|---|---|---|---|
| | | .01 | .001 | .0001 |
| 1 | 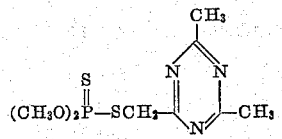 | 100 | 100 | 100 |
| 2 | 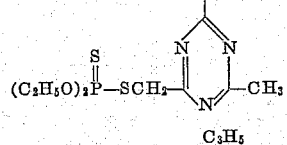 | 100 | 100 | 49 |
| 3 | 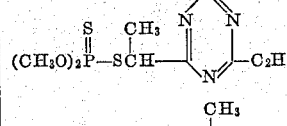 | 100 | 8 | ------ |
| 4 | 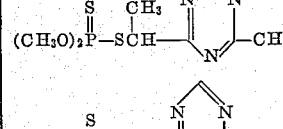 | 100 | 0 | ------ |
| 5 | 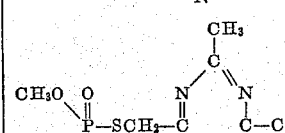 | 100 | 100 | 28 |
| 6 |  | 100 | 50 | ------ |

TABLE I—Continued

| Example | Product | Percent Kill Aphids | | |
|---|---|---|---|---|
| | | .01 | .001 | .0001 |
| 7 | (CH₃O)₂P(S)—SCH₂—[4-methyl-triazinyl]—CH₂S—P(S)(OCH₃)₂ | 100 | 8 | |
| 8 | CH₃O\P(O)(SCH₃)—S—CH₂—C(CH₃)[4,6-dimethyl-triazinyl]—CH₃ | 100 | 100 | |
| 9 | (CH₃O)₂P(S)—S—CH(CH₃)—C(H)[triazinyl]—CH | 100 | 0 | |
| 10 | (CH₃O)₂P(S)—S—CH₂—C[4,6-dimethoxy-triazinyl]—OCH₃ | 100 | 100 | 100 |
| 11 | (CH₃O)₂P(S)—S—CH₂—C[4,6-diethoxy-triazinyl]—OC₂H₅ | 100 | 98 | |

We claim:
1. A triazinyl alkyl phosphate ester of the formula:

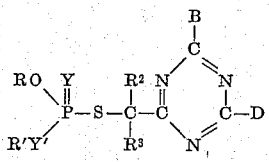

wherein R and R' are each lower alkyl; R² and R³ represent a radical selected from the group consisting of hydrogen and lower alkyl; Y and Y' represent an atom selected from the group consisting of oxygen and sulfur, B stands for hydrogen, lower alkyl and lower alkoxy, D represents a radical selected from the group consisting of hydrogen, lower alkyl, lower alkoxy and the radical:

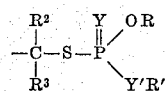

wherein R, R', R², R³, Y and Y' have the values as above defined.

2. O,O-dimethyl S-(4,6-dimethyl-s-triazin-2-yl) methyl ester of phosphorodithioic acid.
3. O,O-diethyl S-(4,6-dimethyl-s-triazin-2-yl) methyl ester of phosphorodithioic acid.
4. O,O-dimethyl S-1-(4,6-diethyl-s-triazin-2-yl) ethyl ester of phosphorodithioic acid.
5. O,O-dimethyl S-1-(4,6-dimethyl-s-triazin-2-yl) ethyl ester of phosphorodithioic acid.
6. O,O-dimethyl S-(s-triazin-2-yl) methyl ester of phosphorodithioic acid.
7. O,O-dimethyl S-(4,6-dimethoxy-s-triazin-2-yl) methyl ester of phosphorodithioic acid.

References Cited in the file of this patent
UNITED STATES PATENTS

| 2,736,726 | Gaetzi et al. | Feb. 28, 1956 |
| 2,880,207 | Schroeder et al. | Mar. 31, 1959 |
| 2,887,432 | Baker et al. | May 19, 1959 |

FOREIGN PATENTS

| 572,314 | Belgium | Apr. 23, 1959 |
| 936,690 | Germany | Dec. 22, 1955 |
| 552,660 | Canada | Feb. 4, 1958 |